Patented Nov. 26, 1929

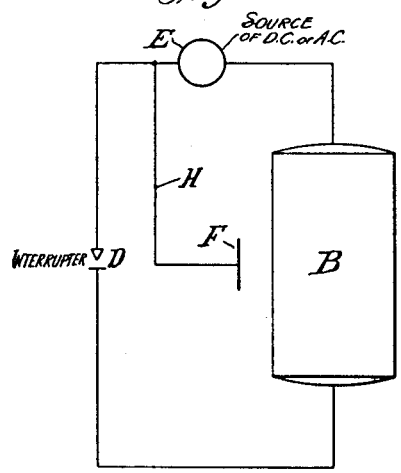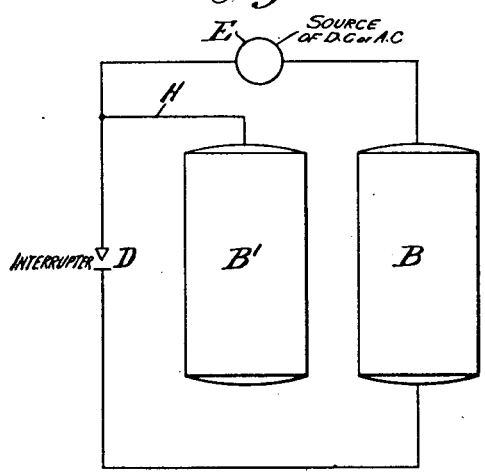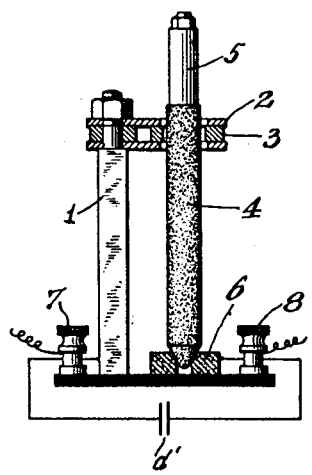

1,736,987

UNITED STATES PATENT OFFICE

WALTER THALHOFER, OF VIENNA, AUSTRIA, ASSIGNOR TO A. G. FUR CHEMISCHE INDUSTRIE IN LIECHTENSTEIN, OF SCHAAN (LIECHTENSTEIN)

PROTECTION OF METALLIC SURFACES AGAINST INCRUSTATIONS AND DEPOSITS

Application filed December 15, 1926, Serial No. 154,919, and in Austria April 2, 1925.

This invention relates to the protection of metallic surfaces against incrustations or deposits, such for example as the protection of boilers, condensers, evaporating vessels or the like, etc., in which hot liquids are contained, against deposit of fur or scale.

The invention contemplates both the method of and apparatus for preventing incrustations or deposit by the use of electric energy.

In the specification of my United States Patent No. 1,558,647, granted October 27, 1925, for protection of metallic surfaces against incrustations and corrosion, there is described a system in which the boiler or other metallic body is connected in a closed circuit with apparatus supplying a "pulsating" current in the circuit, the impressed voltage across the boiler and the current value being very low. In said patent I defined "pulsating currents" as meaning various currents whose line or form characteristic is periodically varied with respect to the zero line whether by interruptions of current flow or by increases and decreases with respect to the zero line without interruptions; and in this specification I use the term "pulsating currents" with the same meaning; and I use the term "pulsating" as applied to potential or voltages as meaning a potential capable of producing such currents.

The object of the present invention is to provide an improved method and apparatus for preventing incrustations by the use of a pulsating electromotive force or current.

The invention consists in novel features of the method hereinafter described according to certain preferred ways of carrying out the invention, and in the novel features and combinations of the apparatus and circuits hereinafter described according to various forms that may be used for carrying out the method.

In further consideration of the operation of the above referred to prior system, I have discovered that the protective effect of the pulsating current is improved in many cases by providing instrumentalities which produce very high frequencies in the electromotive force applied to the body to be protected, i. e., preferably those of the order of magnitude of radio frequencies, particularly where such high frequency current is augmented or amplified and reliably maintained by utilizing apparatus and circuits which will produce a high frequency oscillating circuit for energizing the boiler or other device to be protected.

I have also discovered that if the metallic body to be protected is so connected to the circuit as to subject it to electric potential oscillations, i. e., alternate charge and discharge of said metallic body or surface analogous to the functioning of an electric condenser plate, the protective effect is improved; this being due probably to the fact that this arrangement has the advantage that each and every portion of the irregular metallic surface to be protected, such for example as is found in boilers and the like, is subjected to a more uniform action of the oscillations than is the case in the former system where the boiler was simply connected in a closed metallic circuit with the apparatus for producing the pulsating current, so that the current was simply passed from one wire of the circuit through the irregular mass of metal of the boiler and out through the other wire, in which case all portions of the surface are probably not uniformly affected. It is preferable to effect this condenser action by high frequency potentials.

In order to insure an efficient condenser action I may provide or utilize as the other condenser plate, a suitable metallic plate or body of sufficient surface or mass and sufficiently close to the boiler as to insure an effective condenser action between the two bodies, and I also connect this plate or body to the circuit; the boiler and body preferably being connected up to the circuit so as to be energized by the oscillations produced in the oscillating circuit, as will hereafter be more fully explained. An adjacent boiler, piping of sufficient amount or other metallic body suitably located and arranged, may in some cases be made use of as the other condenser plate instead of providing a special plate for this purpose adjacent to the boiler. Where an adjacent boiler is used for this purpose, it also will receive the protective action against scale formation.

According to the present invention the boiler may be either connected with the potential source in open circuit only, so as to subject it to alternate charge and discharge according to the condenser action, or it may at the same time be connected in a closed metallic circuit with the source so as also to permit the current to flow into and through the boiler as a part of a continuous or return metallic circuit as was done in my said former system.

As was the case with the said prior system, it appears to be immaterial whether the pulsating potential or current is one derived from a source of alternating current or from a source of direct current, both forms as in the prior system being effective.

The invention will be more fully understood from the following description taken in connection with the accompanying drawings in which—

Figs. 5 and 6 show other modifications where, in addition to boilers being connected so as to function according to condenser plate action, they are also connected in a closed metallic circuit with the source; and Fig. 7 illustrates one type of interrupter which may be used in the circuits.

Figure 1:
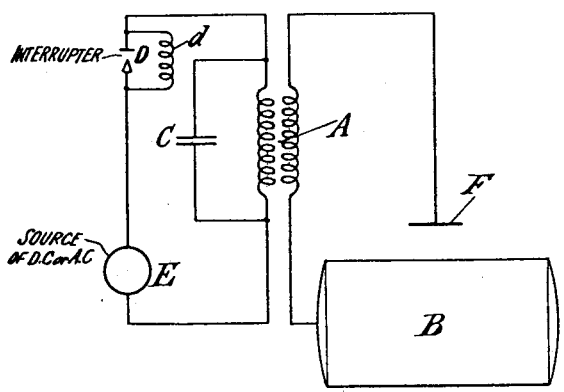
Fig. 1 shows a diagrammatic view of one system or wiring arrangement for producing the desired protective effect by condenser action with the boiler and plate in a high frequency oscillating circuit.

Referring to the drawings—Fig. 1—B is a boiler connected to one side or pole of the secondary of a transformer A, the other side of which is preferably connected to a relatively large metallic plate or body F located in proximity to the boiler and insulated therefrom. This plate is intended to intensify the charging of the boiler with the pulsating potential by acting as a condenser plate with respect to the boiler B which acts as the other condenser plate. The secondary of the transformer is supplied with high frequency pulsating currents from the primary coil which is connected in circuit with any suitable source of direct or alternating current as represented at E, and with an interrupter represented at D. Across the primary coil is connected a condenser C. The interrupter D may be provided with a shunt coil $d$ or a condenser around the contacts. The arrangement of the circuits including the source E, interrupter D, primary coil A and condenser C, is such as to produce an oscillating circuit; preferably one in which high frequency oscillations are set up, preferably of the order of magnitude of radio frequencies, the oscillating circuit being that including primary coil of transformer A and the condenser C. The secondary circuit including the secondary coil of transformer A, boiler B and plate F will also, by reason of the arrangement, receive the oscillations of the oscillating circuit. According to this arrangement the boiler B is subjected to high frequency electromotive force and functions with plate F according to condenser plate action, since the arrangement results in charging the boiler with the pulsating potential analogous to the charging of a condenser plate. Even if the source E is a direct current source or a low frequency alternating current source the interrupter D may be of such a character that the oscillations set up by its arcing in the breaking of the circuit or by its disturbances in the circuit, effect high frequencies in the circuit which are augmented by the oscillating circuit from which the boiler is energized.

Figure 2:
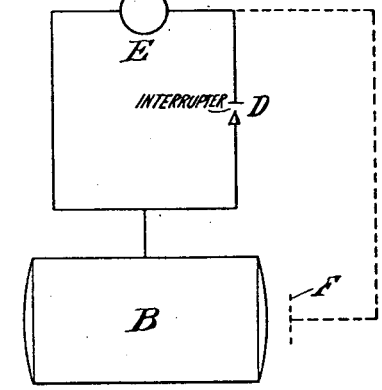
Figs. 2 and 3 show modifications.

In Figure 2 the source of current E and the interrupter D are connected in a closed metallic circuit and one side of this circuit is connected to the boiler B so that the boiler is charged with the high frequency pulsating potential. If desired, the other side of this circuit or the other side of the source of current E may and preferably should be connected, as shown by the dotted lines, to a metallic plate or body F in proximity to the boiler.

Figure 3:
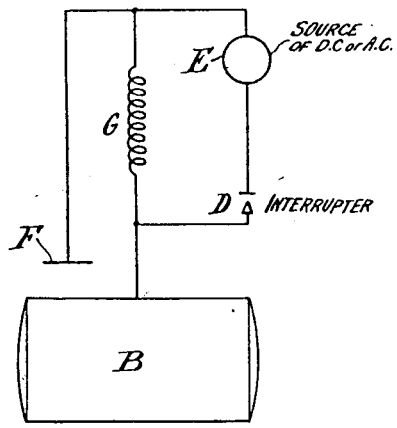

In Figure 3, the source E, the interrupter D and the induction coil G are connected in series in a closed metallic circuit, and a wire from one side of the circuit is connected to the boiler B, the wire from the other side of the circuit not being connected to the boiler, and preferably being provided with a suitable metallic body such as a metallic plate F, so that the boiler is simply charged with the resulting high frequency pulsating potential. In this case the oscillating circuit will include boiler B, coil G and plate F.

Figure 4:
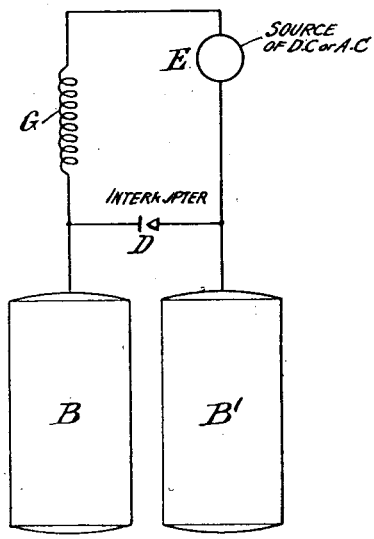
Fig. 4 shows another modification in which the protective potential is applied to two boilers.

In Figure 4 the source E, interrupter D and coil G are connected in series in a closed circuit, and two adjacent boilers B, B' are each connected to a leg of or to one side of said circuit, one on each side of the interrupter, so as to be charged by the resulting high frequency pulsating potential. The two adjacent boilers act as two condenser plates one with respect to the other, and the oscillating circuit in this case includes boiler B, source E, coil G, and the boiler B'.

In Figure 5 the boiler is connected in the closed circuit with the source E and the interrupter D, so that the pulsating current set up in this circuit passes through the boiler as a part of the closed metallic circuit. In addition to this circuit and in order to provide the above referred to condenser action, a suitable metallic body such as the plate F, is arranged in proximity to the boiler and is connected to the first mentioned circuit through wire H, so as to provide an oscillating circuit including boiler B, source E, wire H and plate F. It will be seen from the above that according to this diagram the boiler in addition to having pulsating current pass through it as a part of the closed circuit, is also charged with the higher frequency oscillations or pulsating electromotive force in the manner of a condenser plate, through the instrumentality of the circuit B, E, H, F.

In Figure 6, the two adjacent boilers have been shown one, B, connected in a closed metallic circuit with the source E and the interrupter D, and the other boiler, B', being connected by wire H to the opposite side of the source from that connected to the boiler B. In this case boiler B is traversed with pulsating current in the closed circuit and it is also charged through the resonant circuit B, E, H, B', with higher frequency oscillating potential, in the manner of a condenser plate action; the two boilers acting as two adjacent condenser plates. It will be understood that the frequency of the electromotive force in these oscillating circuits will be of a different frequency from the fundamental frequency of the pulsations in the closed circuit. This is due to the selective function of the oscillating circuit for a particular harmonic component of the irregular wave form of the pulsations in the closed circuit. It will be understood, of course, that an oscillating circuit can be tuned to select any desired frequency by varying the capacities or inductance included in said circuit.

According to the present invention the potential across the secondary of transformer A as in Fig. 1, or the potential or tension applied to the boiler through the oscillating circuits as in the other figures, is not to be limited to the small potentials mentioned in my said prior United States patent, but may be considerably higher—a potential of several volts or even many volts being preferred. Preferably I employ in the closed metallic circuit, when such a circuit is used, a total amperage of only about 70 to 100 milliamperes to the whole of a moderate sized boiler; resulting in a drop of potential across such a boiler, of but a fraction of a volt; approximately .5 millivolts.

Many forms of interrupters may be used either actuated electrically or by mechanical vibrations of the support to which it is secured, but in Figure 7 I have shown, purely by way of illustration, one form of a carbon contact interrupter which has given satisfactory results. This consists briefly of a metallic post 1 to the upper end of which is secured an arm 2 carrying a carbon block 3 having an annular opening through which extends a carbon pencil 4 weighted at its upper end by a metallic weight 5. The lower end of this pencil is beveled and rests upon a carbon block 6 having an annular opening. A binding post 7 is connected to the upright 1 and another binding post 8 is connected to the carbon block 6, and by means of these posts the interrupter is connected in circuit. If it is desired to use a shunt coil or a shunt condenser in connection with the interrupter, the shunt or the condenser d' is connected to the two binding posts so that it is in shunt to the carbon contacts of the interrupter. It is to be understood that this form of interrupter is shown merely by way of illustration because various forms may be used. If this form is used it is secured to some pipe or other convenient device subject to vibrations, so as to effect the desired make and break or interruption of the circuit, or to decrease and increase the current due to variable pressures between the pencil 4 and the carbon block 3 as shown in Figure 7.

As above pointed out, the pulsating electromotive force applied to the boilers is preferably of the character having rapid oscillations such for example as those resulting from the use of a suitable interrupter in the circuit, which may be used with either a direct or alternating current source in various circuits, such for example as those above described; and such rapid oscillations or high frequency may be more reliably applied and insured by the use of high frequency oscillating circuits, preferably provided by utilizing one or more reactance devices in connection with the interrupter, or with a suitable source of current without the interrupter. The numerous arcings of the contacts of the interrupter when it is vibrated, set up high frequencies in the circuit, and these are augmented and amplified by the oscillating circuits. As is known, such frequencies may also be set up in a circuit in cases where the source of current is a suitable alternating current rather than a direct current, by the use of condensers and induction devices without an interrupter.

While I have described my invention with particularity with regard to certain arrangements of circuits for carrying out the invention, it will be understood by those skilled in the art, after understanding my invention, that various changes and modifications may be made and various arrangements of circuits may be utilized without departing from the spirit or scope of my invention, and I aim in the appended claims to cover all such changes and modifications as come within the scope of the invention.

This case is in part a continuation of my application Serial No. 97,671, filed March 26, 1926.

Having thus described my invention, what I claim as new and desire to secure by Letters Patent, is:

1. In a system of the character described, the combination of a metallic body to be protected from incrustations, an electric circuit connected with said body, and means for supplying said circuit with an electric potential having a frequency of the order of magnitude of radio frequencies.

2. In a system of the character described, the combination of a metallic body to be protected from incrustations, a metallic body in proximity thereto, a circuit connecting said two bodies so that they may function as condenser plates when the circuit is energized, and means for energizing said circuit with a pulsating electromotive force.

3. In a system of the character described, the combination of a metallic body to be protected from incrustations, a metallic body in proximity to the first body and external thereto, a circuit connecting said bodies, one end of the circuit being connected to one of said bodies and the other end of the circuit being connected to the other body, and means for energizing said circuit with a pulsating electromotive force.

4. In a system of the character described, the combination of a metallic body to be protected from incrustations, a metallic body in proximity thereto, a circuit connecting said bodies so that they may function as condenser plates when the circuit is energized, and means for energizing said circuit with an electromotive force having a frequency of the order of magnitude of radio frequency.

In testimony whereof I have signed my name to this specification.

WALTER THALHOFER.